Feb. 3, 1970  H. C. O. ROTHS  3,492,786
TRANSPLANT LOADER
Filed Nov. 12, 1965  6 Sheets-Sheet 1

INVENTOR.
Herbert C. O. Roths
BY Karman Karman &
McCulloch
ATTORNEYS

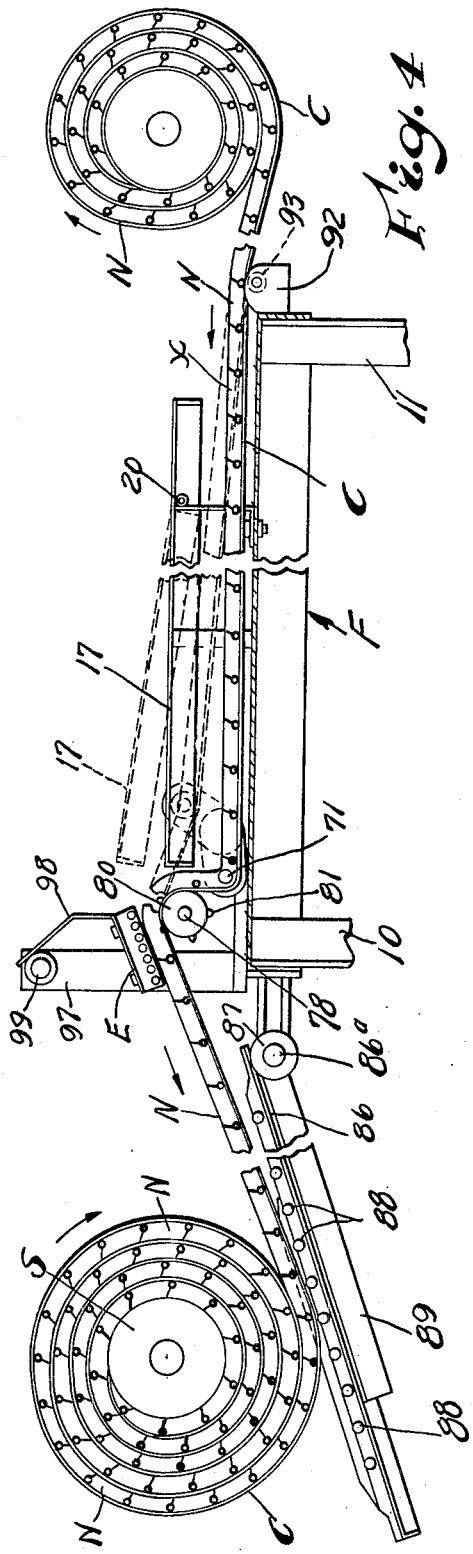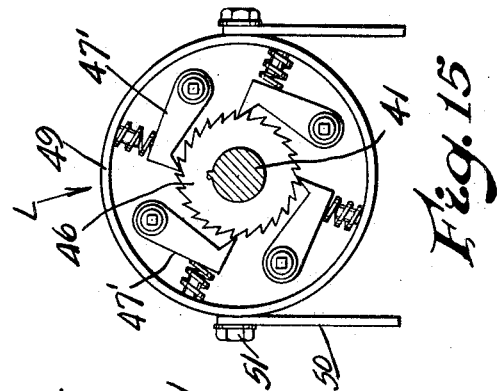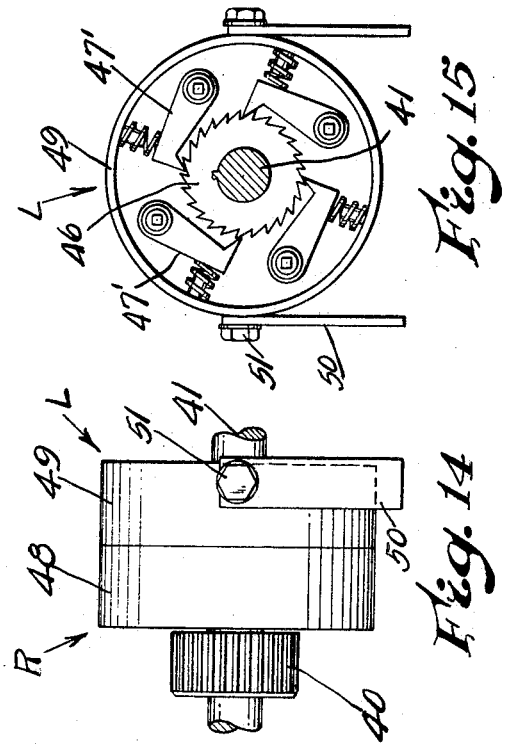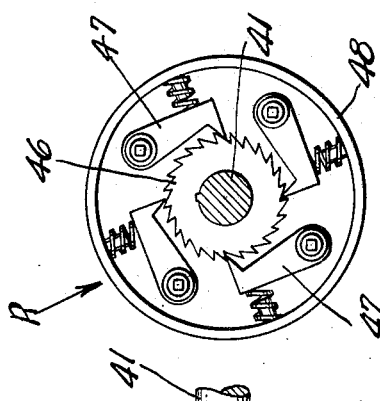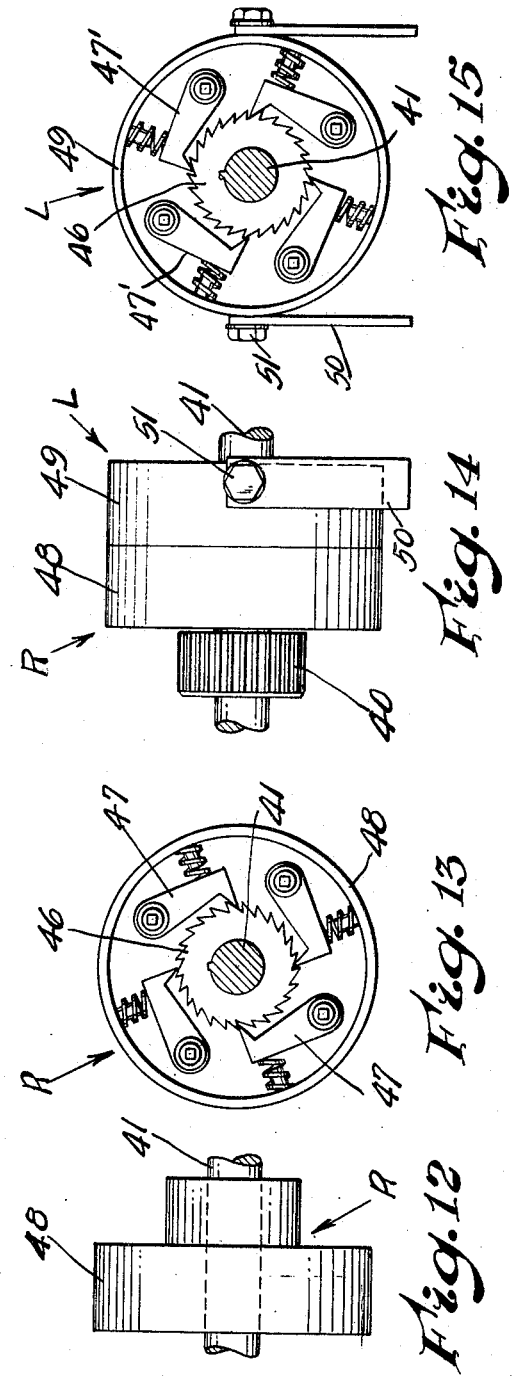

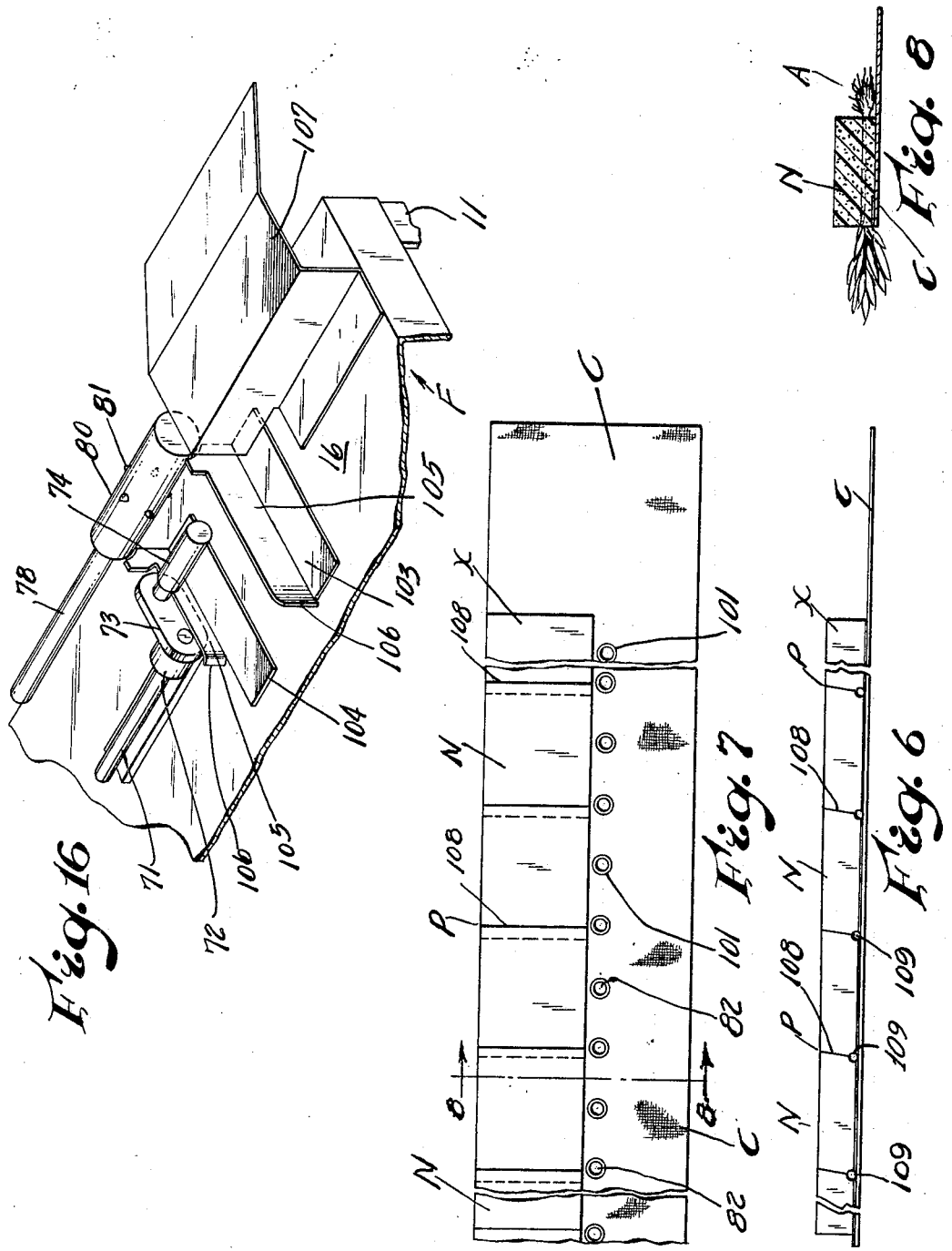

Feb. 3, 1970  H. C. O. ROTHS  3,492,786
TRANSPLANT LOADER
Filed Nov. 12, 1965  6 Sheets-Sheet 6

INVENTOR.
Herbert C. O. Roths
BY Carman Carman & McCulloch
ATTORNEYS

United States Patent Office 3,492,786
Patented Feb. 3, 1970

3,492,786
TRANSPLANT LOADER
Herbert C. O. Roths, 316 Wilson Drive, Orchard Hills, St. Louis, Mich. 48880
Filed Nov. 12, 1965, Ser. No. 508,000
Int. Cl. B65b 15/04, 25/02, 76/00
U.S. Cl. 53—391
15 Claims

ABSTRACT OF THE DISCLOSURE

The instant invention discloses a loading machine for loading transplants into a coilable magazine provided with pockets to accommodate transplants therein, the loaded magazine is then inserted in a container for mounting it on the machine which feeds the transplants in the magazine to the transplanting means as the machine is driven.

---

This invention relates broadly to loading machines for loading transplants such as tobacco, tomatoes, celery, cabbage, and plants of a similar nature, and more particularly to a means for loading the transplants in a magazine so they can be readily mounted on and fed to a transplanting machine without breakage or injury to the transplants.

One of the prime objects of the invention is to provide a driven, coilable transplant magazine having spaced apart pockets therein in which the individual transplants are placed, after which the loaded magazine is inserted in a carrier or container preparatory to mounting it on a machine which feeds the transplants in the magazine to the transplanting means as the machine is driven.

Another object of the invention is to provide a simple, practical and relatively inexpensive magazine formed with evenly spaced apart pockets into which the individual transplants are inserted for holding them, without injury, in a given discharge position as the magazine is loaded and coiled.

A further object is to provide means for automatically opening each individual pocket to permit a single transplant to be positioned therein, which pocket is then automatically closed, preventing slippage or disarrangement of said transplants as the magazine is traveled and wound on a spool on the loader preparatory to being mounted on a transplanting machine for planting in individual rows in a field.

Still a further object is to provide means for obtaining a dwell motion on the magazine driving means to provide balanced indexing regardless of the length of stroke being taken.

A further object still is to provide driving means for controlling the speed of the loader magazine as it travels across the face of the loader and is loaded with transplants, the speed of travel of the magazine automatically controlling the spacing of the transplants as they are planted.

Still a further object is to provide a flexible belt formed with a strip of rubber sponge of predetermined width on the upper face thereof and in which the individual transplants are placed and coiled into magazine bundles as the loader is driven.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit, or sacrificing any of the advantages of the invention.

In the drawings:

FIG. 4 is a fragmentary, side elevational view, the broken lines showing one end of the plant sorting table in raised position.

FIG. 5 is an enlarged, fragmentary, side elevational view showing the means for opening the pockets of the flexible transplant magazine.

FIG. 6 is a fragmentary, edge elevational view of the flexible transplant magazine.

FIG. 7 is a top plan view thereof.

FIG. 8 is a transverse, sectional view taken on the line 8—8 of FIG. 7.

FIG. 12 is a side elevational view of part of the ratchet assembly for obtaining dwell motion.

FIG. 13 is an end elevational view thereof.

FIG. 14 is a side elevational view showing both sections of the ratchet assembly in assembled relation.

FIG. 15 is an end elevational view similar to FIG. 13 and looking into the open end of the stationary housing.

FIG. 16 is an enlarged, fragmentary, isometric view of the loader frame showing the magazine guiding and engaging means.

Figure 1:
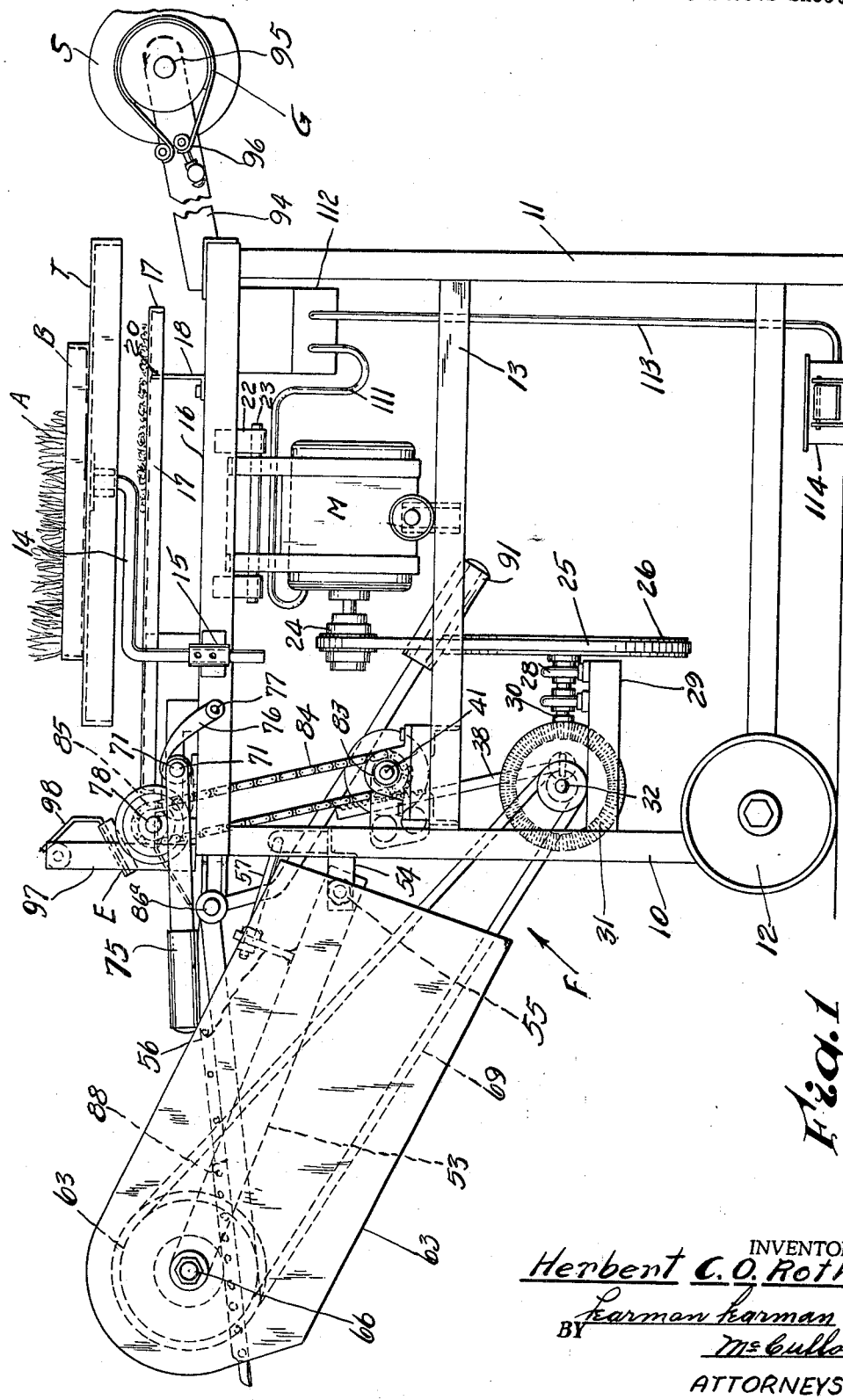
FIG. 1 is a side elevational view of my transplant loading machine, a flat of transplants being shown on the swiveling table, and loose transplants on the sorting table.
Figure 2:
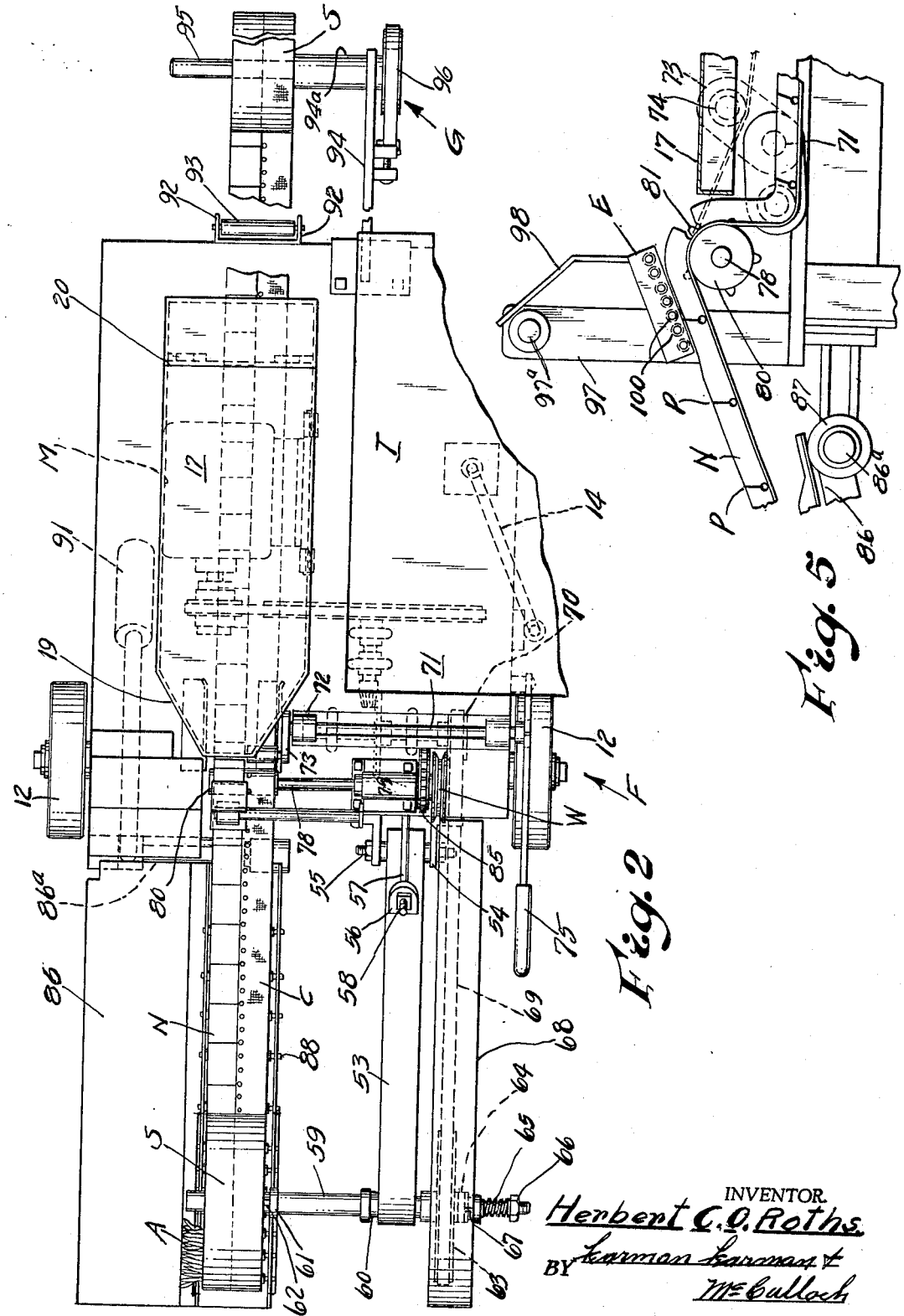
FIG. 2 is a top plan view thereof with the flats and transplants omitted.
Figure 3:
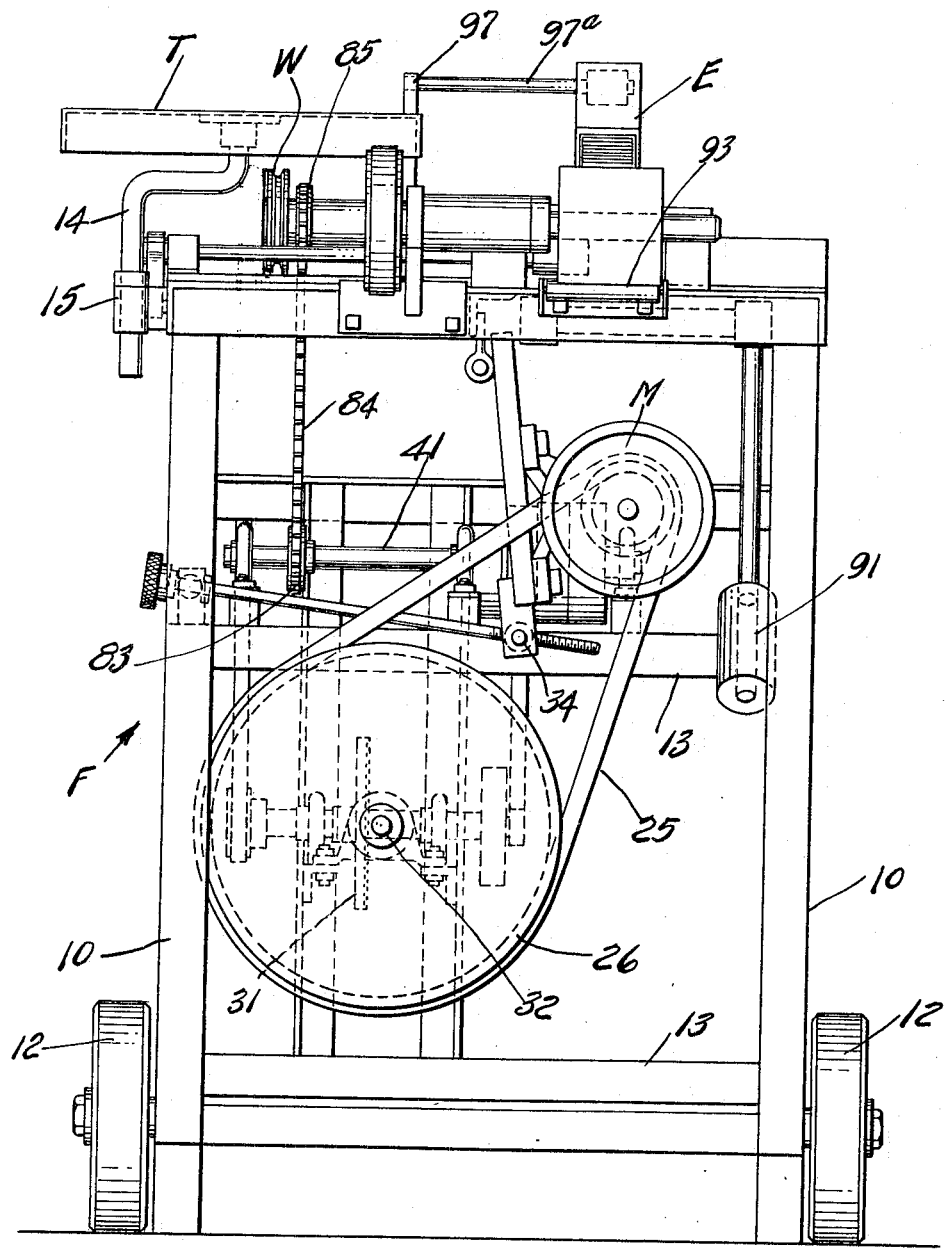
FIG. 3 is an end elevational view of the loader.
Figure 11:
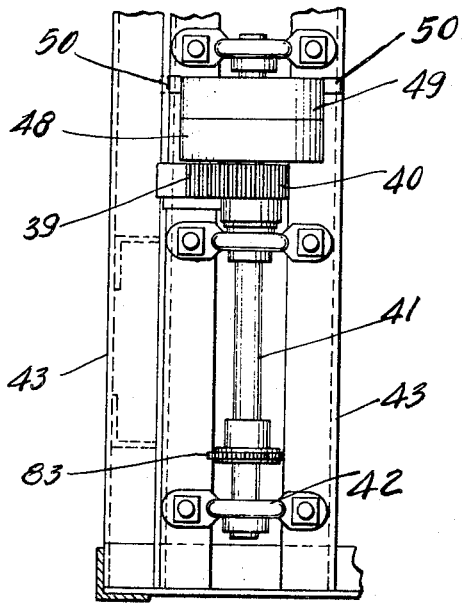
FIG. 11 is also a fragmentary plan view of the intermediate shaft and driving means taken on the line 11—11 of FIG. 9.
Figure 10:
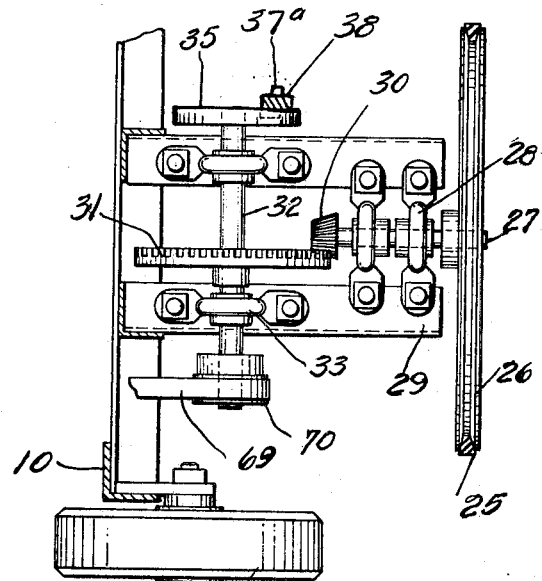
FIG. 10 is a fragmentary, plan view taken on the line 10—10 of FIG. 9.
Figure 9:
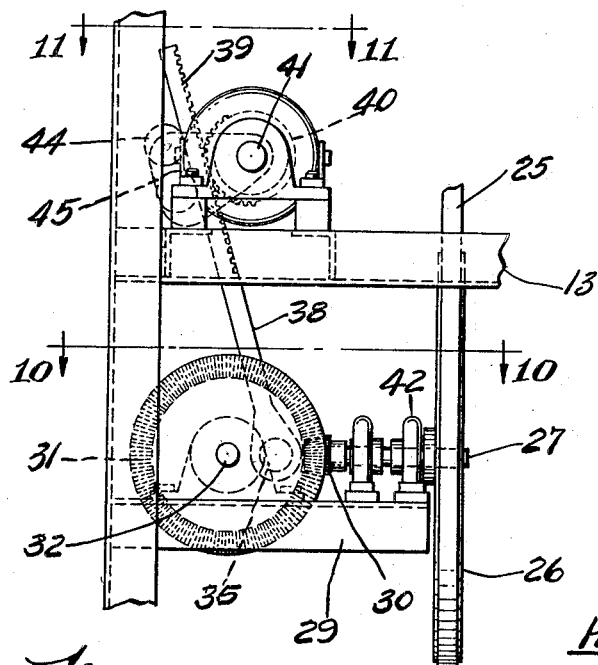
FIG. 9 is a fragmentary, side elevational view of the drive mechanism utilized to provide intermittent motion of the driving means.
Figure 17:
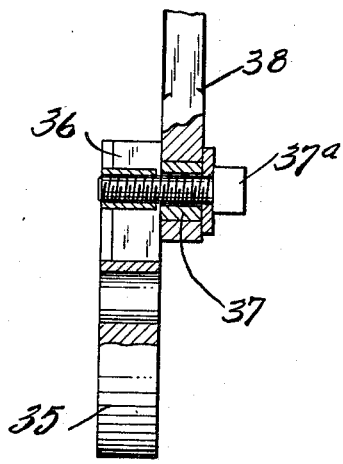
FIG. 17 is an edge elevational view of the connecting rod assembly.

Planting machines for transplanting plants of all kinds have large capacity and in order to supply such machines with the necessary transplants, I find it very advantageous to provide a loader having a flexible traveling magazine in which the transplants are mounted and automatically wound into coiled units which can be stored or immediately used in a planting machine. Such coiled units can be easily and quickly mounted on an automatic transplanter which feeds the transplants to the discharge station of the transplanting machine in proper spaced apart position. As each carrier unit is depleted, it is removed and replaced by another unit and the depleted units may again be loaded and rewound for further use as required.

Referring now to the drawings in which I have shown the means and method of loading the transplants into the magazine and winding the loaded magazine into units of predetermined size. The loader machine comprises a mobile frame F supported on pairs of front and rear legs 10 and 11, respectively, the legs 10 having wheels 12 mounted on the lower end thereof to facilitate easy movement of the loader machine when desired and braces 13 connect said legs for reinforcing purposes.

A swiveling plant-flat accommodating table T has a support 14 which is revolvably mounted in a bearing 15 provided on the upper face 16 of the frame and is swingable to various positions of adjustment to facilitate the easy quick selection of the larger transplants with a minimum of hand movement and ready handling of the individual flats B which are placed thereon. An elongated relatively narrow plant bundle receiving table 17 is spaced above and secured to the top face 16 of the frame F by means of legs 18. The front end of the table is wedge-shaped as at 19 and it is also hinged at a point intermediate its length as at 20 to permit the front end to be swung upwardly as shown in broken lines in FIG. 4 of the drawings and for a purpose to be presently described.

A motor M is mounted on brackets 22 provided on the under side of the top 16 and swings about the point 23. It is provided with a variable speed drive sheave 24, and a belt 25 drivingly connects the sheaves 24 and 26. The sheave 26 is mounted on a shaft 27 journaled in bearings 28 which are mounted on a suitable frame support 29, and a bevel pinion 30 is provided on the one end of the shaft 27, meshing with and driving a bevel gear 31 which is mounted on a transversely disposed shaft 32 journaled in bearings 33. The output speed of the motor is controlled by a control disc 34 as usual, and it is not deemed necessary to show or describe this in detail as it is the conventional type presently in general use.

A disc type crank throw 35 is mounted eccentrically on the shaft 32 and is formed with an adjustment slot 36. A locking screw 37 is threaded in the crank throw 35 and a bearing stud 37a is mounted on said screw and on which the end of the crank throw 35 is journaled, said locking screw being readily adjustable in the adjustment slot 36 as desired.

A gear rack 39 is provided on the upper end section of the connecting rod 38 and has toothed engagement with a gear 40 provided on intermediate shaft 41 which is journaled in bearings 42 provided on supports 43. A roller-back guide fixture 44 is mounted on the intermediate shaft 41 above shaft 32, and is provided with spaced apart rollers 45 journaled therein and against which the connecting rod 38 bears to keep the rack 39 in engagement with the gear 40 and on which the connecting rod 38 bears to minimize friction as the rack is reciprocated.

As power is received from the output end of the gear reduction unit 31 and transmitted to the crank throw 35, the gear rack 39 reciprocates gear 40 which is mounted on the intermediate drive shaft 41. To obtain dwell motion on the shaft 41, a ratchet assembly R is provided. This comprises a ratchet gear 46, keyed on the intermediate shaft 41 and having an uneven number of teeth, including an even number of spring loaded pawls 47 pivotally mounted in an enclosed housing 48 and engageable with the ratchet gear 46, thus providing a balanced indexing mechanism.

In the operation of the mechanism precision "starts" and "stops" must be made, as any over or under-runs would affect the predetermined spacing of the pockets of the magazine being filled with transplants, and this I overcome by utilizing another ratchet assembly L, which assembly is similar to assembly R excepting in its mounting. This housing does not rotate with the shaft as the ends of the legs 50 of housing 49 bear on the loader frame members 43 and prevent rotation with the shaft. This arrangement provides balanced indexing regardless of the length of stroke being taken and is readily adjustable when desired.

An adjustable fulcrum arm 53 is pivotally connected to loader frame brackets 54 by means of bolts 55 or the like, and a vertically disposed bracket 56 is provided on the fulcrum arm 53. A threaded rod 57 is connected to the bracket 56 and to the frame in any desired manner so that the arm may be adjusted by manipulation of nuts 58.

A transversely disposed driven shaft 59 is journaled in a bearing 60 provided on the outer end of fulcrum arm 53, and a stop collar 61 is provided on said shaft at a point spaced from the one end thereon. A key 62 is also provided as shown and a winding spool S is mounted on the end section of the shaft 59 and engages the key 62 as usual.

A pulley 63 is mounted on the shaft 59, and a friction disc 64 is mounted on this shaft, pressure being controlled through a spring 65 which is interposed between adjusting disc 64 and a nut 66 which is threaded on the end of the shaft to tension said spring. The disc 64 floats on a key 67 to prevent loss of tension of the adjusting nut. A shield 68 forms a cover for the above described assembly, and a belt 69 drivingly connects pulley 63 with a pulley 70 provided on driven shaft 32, the belt tension being adjusted by manipulating the nuts 58.

A transversely disposed shaft 71 is journaled in bearings 72 provided on the upper face of the loader and an eccentric bracket 73 is fixedly mounted on the one end thereof. An idler roller 74 is mounted on the free end of the bracket 73 and extends parallel with the shaft 71.

A handle 75 is secured to one end of the shaft 71, and a pawl 76 is pivotally mounted on the frame at the point 77, and when the pawl is disengaged from the shaft 71 actuation of the handle 75 serves to swing said bracket to raise and lower idler 74 as shown in broken lines in FIGURE 5 of the drawings.

Another parallel driven shaft 78 is mounted on the face of the machine above the shaft 71 and is journaled in bearings 79, and a driven feed roller 80 larger than roller 74 is mounted on one end of the shaft and is formed with sprocket-like teeth 81 projecting from the face thereof for engagement with the openings 82 in the flexible magazine belt C as will be hereinafter described.

The roller 80 is positioned a predetermined distance in advance of roller 74 and also spaced a predetermined distance thereabove. This arrangement changes the direction of travel of the magazine from a horizontal to a vertical plane which automatically opens the pockets P as the magazine travels over roller 80 so that the operator can readily place the transplants in position, all as clearly shown in FIGS. 4 and 5 of the drawings.

A sprocket 83 is mounted on the intermediate shaft 41 and a chain 84 drivingly connects sprocket 83 with sprocket 85 mounted on the shaft 78. A hand wheel W is mounted on the shaft 78 and is manually actuated to bring the openings 82 into register with the sprocket teeth 81 of the roller 80 for indexing purposes when necessary.

A swinging table 86 is hingedly connected to a shaft 86a which is mounted in bearings 87 provided on the end wall of the frame to guide the magazine as it is being tightly wound with the coils perfectly flat. To guide the magazine while being wound in order to have the finished coils straight and flat constant pressure is required on the table 86. The upper face of the table is formed with a plurality of rollers 88 spaced for most effective operation, pressure being obtained by use of adjustable weights 91. Relatively short guides 89 are mounted directly beneath the center section of the table to insure straight flat winding of the magazine on the spool S during the loading operation. A couple of guides 90 are mounted on the table 86 and are spaced to permit the edge of the magazine to freely roll through when necessary, and the weights 91 maintain constant pressure on the table 86.

A bracket 92 is secured to the one end of the loader frame F, and a roller 93 is journaled therein and over which the magazine belt C travels when it is being loaded. A bar support 94 projects from one end of the machine and a transversely disposed sleeve 94a is mounted thereon. A shaft 95 is journaled in the sleeve 94a with a conventional brake drum G mounted on one end thereof. A spool S is fixedly mounted on the opposite end of the shaft and from which the magazine is unwound. A brake assembly 96 is provided on bracket 92 for controlling the unwinding of the coiled magazine.

A vertically disposed standard 97 is mounted on the face of the machine directly adjacent the roller 80 and a laterally extending bar 97a projects therefrom and has a pressure shoe E mounted thereon, said shoe comprising a bent resilient leg 98 connected to the bar 97a of the standard in any satisfactory manner. The lower face of the shoe E has a plurality of horizontally disposed rollers 100 journaled therein for yielding engagement with the upper face of the polyethylene carrier section of the magazine to close the pockets as the magazine travels over the roller 80 with the transplants in position therein.

The flexible transplant magazine is wound on a winding spool S carried by the shaft 59 and comprises a flat flexible belt section C having a plurality of spaced apart openings 82 provided with a conventional grommet 101 in each opening (see FIG. 7 of the drawings), said magazine being trained over the roller 93, leading upwardly over the frame F, thence under roller 74, and thence leading upwardly and over the feed roller 80 (see FIG. 5 of the drawings), the teeth 81 of which engage the grommeted openings 101 in the belt.

When threading the magazine the hinged end of the sorting table 17 can be swung up to provide clearance and permit the magazine to travel underneath idler roller 74, thence over roller 80, and thence downwardly, the shoe E closing the pockets to retain the transplants in position. The side wall of each guide section is turned as at 106 for guide purposes and a shield 107 is also secured to the table to form a shield and support for the leaves of the transplants A as they travel thereover.

The transplant carrier section of the magazine is formed of an elongated strip of polyethylene or the like material X provided with accurately spaced apart slits 108 therein, each slit opening into a cylindrical transversely disposed opening 109. This strip is bonded to the face of the belt section C in any satisfactory manner excepting the one outer edge and for a purpose to be presently described.

The circular passages 109 in the carrier strip are shaped to accommodate the shanks of the transplants A and hold them in set position.

When the magazine is completely wound on the spool, it is then tied for handling, removed from the loader and immediately used in a planting machine, or it may be stored until ready for transplating by a suitable transplanting machine (not shown). The transplant roots in the carrier strip project beyond and over the thin section of the belt C and can be placed in a container having sufficient water to cover the roots if required.

It should be borne in mind that the magazine belt C is a relatively thin water resistant fabric strip having the elongated carrier strip X, formed of polyethylene or the like material, which is slit as at 108 to form a plurality of accurately spaced block-like sections N, these slits open into the passages 109 and form the transplant carrying section of the belt. The openings 82 in belt C are engaged by the toothed driven roller 80 and the rollers 74 and 80 do not engage the polyethylene strip N but bear only on the exposed thin section of the belt.

The output speed of the motor is controlled through the conventional control screw disc 34, and the speed of the motor is transferred through V-belt 25 to input sheave 26 of the gear reduction units. The disc type crank-throw 35 is attached to the shaft 32 and has an adjustment slot 36 with a bearing stud 37 adjustably mounted therein to provide the necessary stroke, and the connecting rod 38 is attached by the control screw.

As power is received from the end of the gear reduction unit and transferred to the crank 35, the gear rack 39 reciprocates gear 40, and to obtain a dwell motion on shaft 41 the ratchet assembly R is utilized. This assembly consists of a ratchet gear 46 having an uneven number of teeth, using an even number of spring loaded pawls 47, all having a housing 48 and this provides balanced indexing regardless of the length of stroke.

When operating the loader, precision "starts" and "stops" must be made as any "over" or "under-runs" would affect the predetermined distance of openings in the magazine being filled with transplants, and this I overcome by using two ratchet assemblies each having an even number of pawls and an odd number of ratchet teeth to obtain accurate indexing of the feed and magazine passage opening roll. In operation, one ratchet assembly reciprocates on the return stroke, and the other ratchet assembly which is mounted stationary holds the dwell or stopped forward motion of the feed and magazine passage opening roll in a fixed position.

In practice, the magazine is threaded by actuating the handle 75 to swing the hinged auxiliary table 17 up (see broken lines in FIG. 4 of the drawings). After threading is completed the table is lowered and flats of transplants A are then placed on the swivel table T and are transferred to the auxiliary bundle receiving table 17 as required. The operator is stationed directly adjacent the tapered end of the hinged sorting table 17 and as the motor is energized the magazine is drawn over roller 93, thence under roller 74, and thence vertically and over rolled 80, at which point the pockets P will be open due to the change in direction and plane of travel of the magazine carrier, and when each pocket opens, a transplant is manually placed therein.

The pressure shoe E with rollers 100 bears on the upper face of the polyethylene strip section X to close the pockets and the angle of run closes the pockets with the transplants A yieldingly held therein to correct position.

The motor M is connected to a suitable source of electrical energy by means of a line 111 leading to a box 112 and another line 113 leads from said box to a foot operated control 114 so that the operator uses his or her foot to actuate the control and both hands are free to choose and insert the transplants in the pockets.

From the foregoing description, it will be obvious that I have perfected a simple, practical and relatively inexpensive means for mounting transplants in a magazine, which magazine is coiled on individual spools for ready transfer and mounting on a transplanting machine for planting the transplants in a field in rows in accurately spaced apart relation.

What I claim is:

1. A transplant loader means having a magazine strip including yieldable means formed of flexible material secured to the face of the strip, there being transplant cavities in said yieldable means forming pockets to accommodate transplants therein when the direction of travel of the magazine strip is changed comprising: a frame structure; a receiving spool on the frame; means for driving said spool to wind said magazine strip on said spool; and means for changing the direction of travel of said magazine strip to close said pockets as the magazine travels to said spool.

2. A transport loading means having a magazine strip including a flexible, coilable belt having a strip of flexible resilient material secured on the upper face thereof and adjacent one edge of said belt; transplant cavities in said resilient material forming pockets to accommodate transplants therein when the direction of travel of said magazine strip is changed; and openings in said belt in linear spaced relation in the space adjacent to said flexible strip comprising: a frame structure; means to change the direction of travel of the magazine strip; a receiving spool on the frame; means for driving the spool to wind said magazine strip on said spool; and a guide sprocket on said frame and engageable with said coilable belt for opening and closing the pockets in said magazine.

3. A transplant loading means having a magazine strip including yieldable means formed of flexible material secured to the face of the strip, there being transplant cavities in said yieldable means forming pockets to accommodate transplants therein when the direction of travel of the magazine strip is changed comprising: a frame structure; a receiving spool on the frame; means for driving the spool to wind said magazine strip on said spool; an idler roller provided on the loader for engagement with the upper face of the traveling magazine belt in the space adjacent the yieldable means, but without engagement with said yieldable means; means to change the direction of travel of the magazine strip; and a guide roller spaced ahead and above said idler roller for altering the direction of said magazine strip.

4. A transplant loader machine having a flexible, coiled magazine means mounted on a rear spool on the rear end of the machine for traveling across the frame of the machine provided with an elongated strip of resilient flexible material on the upper face of the magazine means and adjacent one edge thereof comprising: a frame; a rear spool mounted on the rear of the frame; said magazine means being mounted on said rear spool for travel across the face of said frame; a driven winding spool mounted on the front end of the machine; guide means on said frame and engageable with said magazine; means for guiding said magazine means as it travels across said frame; means for winding said magazine means on the driven spool as said driven spool is driven and simultaneously unwinding the magazine means from the rear spool as the magazine travels across said frame; a swinging guide table hingedly secured to the front end of the frame; means on said table for tensioning said magazine means; and pressure means provided on the frame and yieldably engaging the face section only of said strip after the transplant is entered in the magazine means and the magazine means travels over said frame.

5. A transplant loader machine having a flexible coiled magazine means comprising: a frame; a rear spool on the rear of the frame, said flexible coiled magazine means being mounted on said rear spool for travel across the face of said frame; a driven winding spool mounted on the front end of the machine; guide means on said frame and engageable with said magazine means for guiding said magazine means as it travels across said frame; means for winding said magazine means on the driven spool as said driven spool is driven and simultaneously unwinding the magazine means from the rear spool as the magazine travels across said frame; a swinging guide table hingedly secured to said magazine means; and speed reducing means and a ratchet assembly associated therewith and operable to produce intermittent motion to control the travel of said magazine means.

6. A transplant loader machine including a flexible coiled magazine means comprising: a frame; a rear spool mounted on the rear of the frame, said flexible coiled magazine means being mounted on said rear spool for travel across the face of said frame; a driven winding spool on the front end of the machine; guide means on said frame and engageable with said magazine means for guiding said magazine means as it travels across said frame; means for winding said magazine means on the driven spool as the driven spool is driven and simultaneously unwinding the magazine means from the rear spool as the magazine means travels across said frame; a swinging guide table hingedly secured to the front end of the frame; means on said table for tensioning said magazine means; a shaft; an eccentric bracket mounted on one end of said shaft; an idler roller on said eccentric bracket in engagement with the upper face of said magazine and manually actuated means for swinging said bracket to raised position to permit threading the magazine on the spool at the front end of said machine.

7. A transplant loading machine including a coiled magazine of predetermined length comprising: a frame; a motor mounted on said frame; individual spools mounted on the front and rear of said frame; said magazine being wound on the spool on the rear end of said frame and driven from said motor; said magazine leading to and being wound on the spool on the front end of the frame as the front spool is driven; means engageable with the front spool for biasing the rotating movement thereof; and braking means associated with the rear spool for controlling the unwinding of the magazine therefrom.

8. A transplant loading machine as set forth in claim 7 including a fulcrum shaft hingedly and adjustably supported on the front end of the frame and drivingly connected to an intermediate shaft; means for intermittently driving said first mentioned said shaft from said intermediate shaft; and manually controlled means for indexing said magazine driving means.

9. A transplant loading machine including a magazine means having openable pockets comprising, in combination: a frame; front and rear individual spools mounted on the front and rear ends, respectively, of said frame; a guide sprocket mounted between said spools, said magazine means being coiled on the rear spool and leading around said sprocket to said front spool; means associated with said sprocket to change the direction of travel of said magazine sufficiently so that said magazine pockets open when the magazine travels around said sprocket; means for driving the front spool; and means for controlling the rotation of said rear spool.

10. The combination set forth in claim 9 in which a swiveling transplant bundle table is revolvably mounted on the frame structure, and a hingedly mounted auxiliary table is also mounted on said structure and on which the transplants are supported prior to individual mounting in the pockets in said traveling magazine.

11. The combination defined in claim 7 in which a fulcrum arm is hingedly and adjustably connected to the front end of the frame; a transversely disposed driven shaft journaled on said fulcrum arm and on which the front spool is mounted, and means for biasing said shaft by applying friction thereto as the machine is driven.

12. The combination set forth in claim 9 in which a table hingedly connected to the front of the machine exerts a constant upward pressure on said front spool and the magazine wound thereon, and roller means provided on the face of said table for yieldingly engaging said magazine belt as it travels to the front spool.

13. A transplant loading machine including a magazine means having openable pockets comprising: a frame; front and rear individual spools mounted on the front and rear ends, respectively, of said frame; a guide sprocket mounted between said spools, said magazine means being coiled on the rear spool and leading around said sprocket to said front spool; means for driving said front spool; and means associated with said sprocket to change the direction of travel of said magazine sufficiently so that said magazine pockets open when said magazine means travels around said sprocket.

14. A transplant loading machine as set forth in claim 13, including a swinging guide table hingedly secured to the front end of the frame and means on said table for tensioning said magazine means.

15. A transplant loading means including: a frame; a flexible transplant magazine mounted on said frame for travel across the face thereof and having a strip of flexible, resilient material on its outer face; said resilient strip including transversely disposed linear spaced apart passages in its inner surface and having transversely disposed slits opening into said passages; an idler roller; a magazine engaging guide roller for changing the direction of travel of said magazine and opening and closing said slits; and driving means mounted on said frame and drivingly engageable with said flexible transplant magazine to move said magazine over said idler roller and said magazine engaging guide roller; said magazine leading away from said magazine engaging guide roller to permit said slits to close and yieldably secure transplants in said magazine passages.

References Cited
UNITED STATES PATENTS

| | | | |
|---|---|---|---|
| 2,203,079 | 6/1940 | Chandler | 53—387 |
| 2,794,606 | 6/1957 | Miller | 242—67.3 |
| 3,046,714 | 7/1962 | Malicay | 47—56 X |
| 3,298,624 | 1/1967 | Schott | 242—67.1 |

THERON E. CONDON, Primary Examiner

E. F. DESMOND, Assistant Examiner

U.S. Cl. X.R.

111—2; 242—67.1